June 9, 1959  J. A. SHAFER  2,889,784
CAR TRUCK
Filed Nov. 21, 1955

TOWARD CENTER OF CAR

INVENTOR.
JAMES A. SHAFER
BY Henry Kozak
ATTORNEY

United States Patent Office 2,889,784
Patented June 9, 1959

2,889,784

CAR TRUCK

James A. Shafer, East Cleveland, Ohio, assignor to National Malleable and Steel Castings Company, Cleveland, Ohio, a corporation of Ohio Application November 21, 1955, Serial No. 548,053

10 Claims. (Cl. 105—197)

This invention relates to railway car trucks, and more particularly to a bolster thrust device that provides for frictional control of the oscillations of the bolster supporting springs of the truck.

The need for friction means in car trucks to damp oscillations of the bolster supporting springs is well recognized. Although new car trucks are usually provided with built-in friction systems for controlling the oscillations of the bolster supporting springs, there are in service hundreds of thousands of car trucks in which the bolster is entirely supported on unsnubbed springs.

The present invention provides a simple, yet effective bolster thrust device for resiliently urging the bolster of an unsnubbed type car truck into frictional engagement with the side frame of the truck to thus effectively control the oscillations of the bolster supporting springs.

It is therefore the primary object of the invention to provide bolster thrust means for use with a car truck of the unsnubbed type to effectively control the oscillations of the bolster supporting springs.

Another object of the invention is to provide, in a car truck of the unsnubbed type, a bolster thrust device that resiliently urges the bolster into frictional engagement with the columns of the side frames to control the oscillations of the bolster supporting springs.

A more specific object of the invention is to provide bolster thrust means for use in a car truck of the unsnubbed type, comprising a telescoping, spring actuated piston and cylinder device adapted to act between the side frames and the ends of the bolster, to resiliently urge the bolster into engagement with adjacent columns on the side frames, to frictionally control the oscillations of the bolster supporting springs.

A still further object of the invention is to provide a device of the aforementioned type, embodying adjusting means whereby the spring force urging the bolster into frictional engagement with the side frames may be varied.

Other features and advantages of the invention will be apparent from the following description taken in conjunction with the drawings, wherein.

Figure 1:
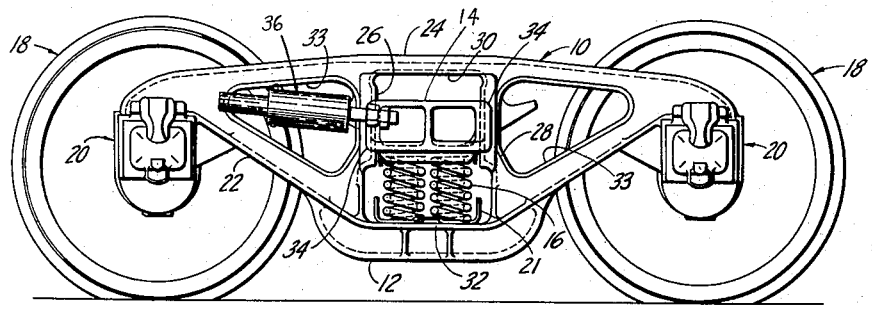
Fig. 1 is a side elevational view of a conventional unsnubbed type car truck to which the invention has been applied.

Referring to the drawings, there is shown a car truck 10 of the type in which there is no friction system for controlling the oscillations of the bolster supporting springs. Truck 10 comprises the conventional spaced side frame members 12, car body supporting bolster member 14, bolster supporting spring groups 16 and track engaging wheel and axle assemblies 18 mounted on the side frames 12 at axle journal boxes 20. In this particular embodiment, a spring plank 21 is interposed between each spring group 16 and the corresponding side frame.

Each side frame 12 comprises the usual tension member 22, compression member 24, and spaced columns 26 and 28 connecting the tension and compression members and forming a bolster receiving opening 30 therewith. The lower ends of columns 26 and 28 are spaced apart a greater amount than the upper portions thereof to form a widened lower portion of bolster receiving opening 30. Bolster 14 extends into opening 30 in each of frames 12 and rests on spring group 16 which is supported on spring seat portion 32 of tension member 22. Adjacent their outer ends, tension and compression members 22 and 24 merge to form, in combination with columns 26 and 28, spaced window openings 33.

Bolster 14 is provided adjacent both columns with inner and outer guide lugs 34 which overlap the portions of columns 26 and 28 that are disposed above the widened lower portion of opening 30, the lugs being of such a vertical dimension as to pass through the lower portion of opening 30 to permit the bolster to be withdrawn from the frame during assembly and disassembly of the truck.

In accordance with the invention, thrust device 36 extends into one of window openings 33 in each of the side frames and acts between the juncture of tension and compression members 22 and 24 and the outer end of the bolster to resiliently urge the bolster into engagement with an opposing column on the frame. As will be seen in Fig. 2, a pair of thrust devices is used per car truck, both devices acting against the same side of the bolster.

In the embodiment shown, thrust device 36 comprises a cylinder or casing portion 38 which is open at one end and is closed at the other by an end wall 38a. Extending outwardly from wall 38a and formed integrally therewith is a threaded shank portion 38b which extends through an opening 40 in bracket member 42, suitably secured to the outer end of the bolster as by means of a weld 43.

Bracket member 42 extends outwardly from the end of bolster 14 and comprises a diagonally bent outer portion 42a. It will be understood that bracket 42 serves merely as an abutment for one end of the thrust device 36 and if the bolster member 14 extended laterally of the side frame, a greater amount than illustrated, such abutment could be formed by merely drilling a hole in the bolster rather than by providing a separate bracket, as shown.

Figure 3:
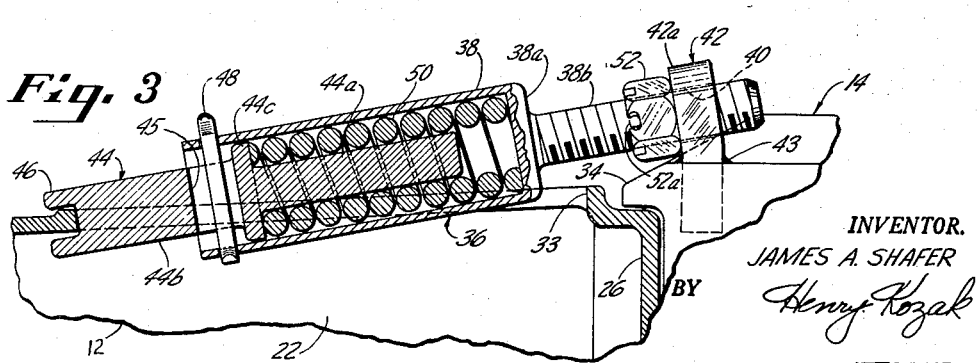
Fig. 3 is an enlarged fragmentary plan view, partly in section of the bolster thrust device as applied to one side of the car truck.

A movable plunger or piston member 44 (Fig. 3) is provided in casing 38. Plunger 44 comprises an inner stem portion 44a and an outer stem portion 44b which extends through the open end of the casing. The outer end of stem portion 44b is bifurcated as at 46 for straddling an edge portion of the outer web which partially defines the periphery of the window 33 of the side frame at the juncture of tension and compression members 22 and 24, to anchor the end of the plunger relative to the frame. Disposed intermediate stem portions 44a and 44b and formed integrally therewith is a spring abutment portion 44c. An opening 45 is provided forwardly of abutment portion 44c for receiving a retaining pin 48 which extends through opening 45 and through aligned openings in the casing 38 to maintain the thrust device in assembled condition prior to its assembly in the car truck.

Disposed between abutment portion 44c of the plunger and end wall 38a of casing 38 is resilient means 50 which in the embodiment shown is a coil spring. It will be understood, of course, that means 50 may comprise any suitable resilient material, such as rubber. Resilient means 50 is assembled under an initial compression and transmits a thrust force to the bolster to resiliently urge the bolster into engagement with side frame columns 28 on the other side of the bolster. A nut 52, threaded on shank portion 38b of casing 38 provides means for adjusting the amount of thrust exerted by spring 50 against the bolster. It will be seen that turning nut 52 from the position shown so as to move the nut nearer the outer end of threaded shank portion 38b will increase the compression of spring 50 and thus increase the thrust urging the bolster into engagement with the column of the side frame. A locking pin 52a (Fig. 3) maintains nut 52 fixed relative to portion 38b.

It will be understood, of course, that the parts of thrust device 36 may be reversed from that shown so that the adjusting nut and threaded shank arrangement will be associated with plunger 44 rather than with shank 38b as shown. In either case, the same result of an adjustable thrust transmitting means for urging the bolster into engagement with the columns is obtained.

Assembly of the bolster thrust device is as follows:

Spring means 50 is inserted through the open end of casing 38 and moved into engagement with end wall 38a. Next plunger 44 is inserted into the open end of casing 38 and moved inwardly toward end wall 38a so as to compress spring means 50 a sufficient amount to permit insertion of retainer pin 48 through the aligned openings in the casing 38 and through opening 45 in plunger 44. The force urging the plunger inwardly into casing 38 is then removed and the resistance to compression of spring means 50 causes the plunger to move outwardly into engagement with retainer pin 48 to maintain thrust device 36 in assembled condition. In the latter condition, thrust device 36 may be conveniently stored or shipped as a unit assembly without the necessity of handling a number of separate parts. This represents a distinct advantage and results in substantial labor savings to the railroad by eliminating the necessity of assembling various individual parts prior to installing the device in a car truck.

To assemble the bolster thrust device in a car truck, the holding nut 52 is turned on threaded shank portion 38b so as to be moved adjacent end wall 38a of casing 38. The end of shank portion 38b is then fed through opening 40 in bolster bracket 42 and bifurcated portion 46 of plunger 44 is placed in straddled relationship with the web of side frame 12 at the juncture of tension and compression members 22 and 24. Next, nut 52 is turned down into abutting engagement with bracket 42 and tightened to place spring means 50 under the desired compression. Locking pin 52a is then inserted to maintain nut 52 in fixed position.

It will be seen that one thrust device per side frame is shown, each device extending into one of window openings 33 in the side frame and urging the associated end of the bolster against an adjacent column in the frames. It will also be noted that the thrust device 36 in each frame is disposed on the same side of the bolster so as to urge the bolster in the same direction and thus ensure full surface engagement between the ends of the bolster and the engaged columns on the frames. As the bolster supporting springs 16 oscillate in service, the frictional engagement between the ends of the bolster and columns 28 on the side frames effectively damps the spring movement and provides a much smoother riding car truck. Bifurcated end 46 of plunger 44 of thrust device 36 as aforesaid straddles the outer web of each of the side frames of the car truck at the juncture of tension and compression members 22 and 24. As the bolster moves up and down in service, the bifurcated end of plunger 44 allows the device to pivot with respect to the side frame in response to the bolster movement. Also opening 40 in bracket 42 is sufficiently large to enable the threaded shank portion 38b of the device to pivot vertically with respect to the bolster without binding. It will be seen, therefore, that thrust device 36 has a cradle or rocking action during vertical movement of the bolster in service.

If desired, wear plates may be inserted between column 28 of the side frames and the engaged side of the bolster to decrease wear of the engaging surfaces. It will be observed that opening 45 in plunger 44 of the thrust device is of sufficient size that when the latter is in assembled position in the car truck, no engagement occurs between the plunger and the retaining pin 48. It will also be noted that inner stem portion 44a of the plunger is of sufficient length to maintain the columnar stability of the thrust device while still permitting some flexibility.

Figure 2:
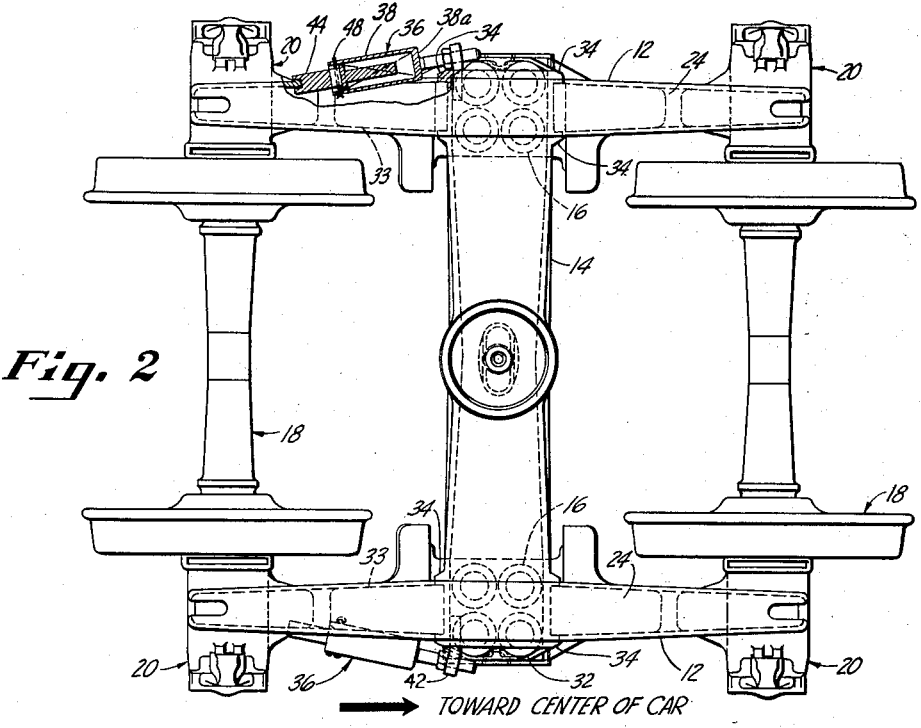
Fig. 2 is a plan view partly in section of the car truck shown in Fig. 1.

It is preferable that the thrust devices be so installed on the car truck as to urge the bolster toward the center of the car, as indicated by the direction of the arrow in Fig. 2. The reason for this is that the brake rigging on a car truck generally urges the bolster toward the center of the car when the brakes are applied, and consequently if the bolster thrust units would be so positioned as to urge the bolster in the opposite direction, or away from the center of the car, during application of the brakes, there is the possibility that there would be reduced snubbing of the oscillations of the bolster springs, as will be readily understood by those skilled in the art.

From the foregoing description and accompanying drawings, it will be readily understood that the invention provides novel bolster thrust means for controlling the oscillations of the bolster supporting springs of a car truck of the unsnubbed type, said means comprising a telescoping spring actuated piston and cylinder arrangement for urging the ends of the bolster into frictional engagement with opposing columns on the side frames. It will also be understood that the device provides novel, yet simple means for adjusting the amount of force for urging the bolster into engagement with the side frames.

The terms and expressions which have been employed are used as terms of description and not of limitation and there is no intention of excluding such equivalents of the invention described or of the portions thereof as fall within the purview of the claims.

What is claimed is:

1. In a car truck comprising a pair of side frames and a bolster extending between said frames, each of said frames including a tension member, a compression member and columns extending between said members, spring means on said frame for supporting said bolster, said columns being disposed adjacent to and on opposite sides of said bolster, and means for urging said bolster longitudinally of said frames into engagement with certain of said columns, said means comprising a thrust device anchored to each frame and to the bolster, each said device being located on the same side of said bolster and engaging the latter on the outboard side of the associated one of said frames.

2. A car truck comprising a side frame member having a bolster receiving opening defined by a tension section, a compression section and a pair of columns extending between said sections, a bolster member extending into said opening, spring means supporting said bolster on said frame, a plunger element anchored to one of said members, a casing element anchored to the other of said members, and resilient means in engagement with and compressed between said plunger and said casing for urging one side of said bolster against one of said columns, said elements and said resilient means being located on the other side of said bolster generally adjacent the outboard side of said frame.

3. A car truck in accordance with claim 2 in which means is provided for adjusting the compression of said resilient means.

4. In a car truck a side frame comprising tension and compression members merging at the ends of the frame, said frame having a bolster receiving opening and a column partly defining said opening, a bolster extending into said opening, a thrust transmitting device for urging said bolster into engagement with said column, said device comprising an element anchored to one end of said frame at the juncture of said tension and compression members, another element anchored to said bolster generally adjacent the outboard side of said frame, and spring means compressed between said elements.

5. In a railway car truck, a side frame comprising a tension member, a compression member, columns connecting said tension and compression members and defining therebetween a bolster receiving opening, a spring group disposed in said opening on said tension member, a bolster received in said opening and being resiliently supported on said spring group, said tension and compression members merging adjacent their outer ends to form, a combination with said columns, spaced window openings, thrust means extending into one of said window openings, one end of said means engaging said frame at the juncture of said tension and compression members and the other end of said means engaging said bolster outboard of said columns, said means comprising a spring actuated plunger and casing arrangement for urging the bolster into frictional engagement with one of said columns.

6. In a car truck in accordance with claim 5 wherein said bolster comprises a laterally extending bracket attached to the end of said bolster, said bracket being adapted for abutting engagement with said other end of said thrust means.

7. A bolster thrust device for urging a bolster into frictional engagement with a side frame of an unsnubbed type car truck, comprising a casing member, said member being open at one end, a threaded shank portion extending outwardly from said member on the other end thereof, an adjustable nut threaded on said shank portion, a movable plunger member extending into said open end of said casing member, resilient means under initial compression disposed between and in engagement with said plunger and said casing, and retaining means carried by said casing member for limiting the movement of said plunger outwardly of said casing member.

8. A bolster thrust device in accordance with claim 7 wherein the inner end of said plunger comprises an elongated stem portion extending into said resilient means, said stem portion being in close fitting relationship to said resilient means to maintain the columnar stability of the device.

9. A bolster thrust device for urging a bolster into frictional engagement with a side frame of an unsnubbed type car truck, comprising a casing member open at one end and closed at the other end by an end wall, said wall having an integral portion extending outwardly therefrom lengthwise of the casing, a plunger member including an abutment portion disposed intermediate an inner stem portion and an outer stem portion, said inner stem portion extending into the open end of said casing member, adjustable spring means under predetermined initial compression reacting between said abutment portion and said end wall, and retaining means carried by said casing member for engaging said abutment portion for limiting the movement of said plunger outwardly of said casing member.

10. A bolster thrust device in accordance with claim 9 wherein said casing member comprises a threaded shank portion and a nut threaded on said shank for adjusting the reaction of said spring means against said members when the device is applied to a side frame and bolster.

References Cited in the file of this patent

UNITED STATES PATENTS

| | | |
|---|---|---|
| 1,414,958 | Kadel | May 2, 1922 |
| 1,704,394 | Link | Mar. 5, 1929 |
| 2,377,178 | Pierce | May 29, 1945 |
| 2,705,633 | Potter et al. | Apr. 5, 1955 |
| 2,737,126 | Rossell | Mar. 6, 1956 |